United States Patent [19]
Carter et al.

[11] 3,903,202
[45] Sept. 2, 1975

[54] CONTINUOUS MASS POLYMERIZATION PROCESS FOR POLYBLENDS

[75] Inventors: Don E. Carter, Creve Coeur, Mo.; Robert H. M. Simon, Longmeadow, Mass.

[73] Assignee: Monsanto Company, St. Louis, Mo.

[22] Filed: Sept. 19, 1973

[21] Appl. No.: 398,721

[52] U.S. Cl. .......................... 260/880 R; 260/95 C
[51] Int. Cl.² .......................................... C08F 2/02
[58] Field of Search ...................... 260/880 R, 95 C

[56] References Cited
UNITED STATES PATENTS

| | | | |
|---|---|---|---|
| 3,243,481 | 3/1966 | Ruffing et al. | 260/880 |
| 3,439,065 | 4/1969 | Luftglass | 260/880 |
| 3,513,145 | 5/1970 | Crawford | 260/880 |
| 3,658,946 | 4/1972 | Bronstert | 260/880 |

Primary Examiner—Joseph L. Schofer
Assistant Examiner—P. R. Michl
Attorney, Agent, or Firm—Joseph S. Nelson; Edward P. Grattan; James C. Logomasini

[57] ABSTRACT

This invention relates to a process for the continuous mass polymerization of polyalkenyl aromatic polymers having a grafted diene rubber phase dispersed therein. Said process continuously and progressively mass polymerizes a monomer composition comprising at least one monoalkenyl aromatic monomer having about 2 to 15% of a diene rubber dissolved therein through an initial reaction zone wherein about 10 to 50% conversion of monomer to polymer is realized along with a dispersion of said rubber as rubber particles followed by progressive polymerization through a staged, isobaric stirred reaction zone under substantially linear flow wherein the morphology of the dispersed rubber particle phase is maintained and said polyalkenyl aromatic polymer formed has a predetermined and controlled molecular weight distribution as a rigid phase of the polyblend.

21 Claims, 2 Drawing Figures

CONTINUOUS MASS POLYMERIZATION PROCESS FOR POLYBLENDS

BACKGROUND OF THE INVENTION

As is well known, polyblends of rubber with monoalkenyl aromatic polymers have significant advantages in providing compositions of desirable resistance to impact for many applications. Various processes have been suggested or utilized for the manufacture of such polyblends including emulsion, suspension and mass polymerization techniques, and combinations thereof. Although graft blends of a monoalkenyl aromatic monomer and rubber prepared in mass exhibit desirable properties, this technique has a practical limitation upon the maximum degree of conversion of monomers to polymer which can be effected because of the high viscosities and accompanying power and equipment requirements, which are encountered when the reactions are carried beyond a fairly low degree of conversion after phase inversion takes place. As a result, techniques have been adopted wherein the initial polymerization is carried out in mass to a point of conversion beyond phase inversion at which the vicosity levels are still of practical magnitudes, after which the resulting prepolymerization syrup is suspended in water or other inert liquid and polymerization of the monomers carried to substantial completion.

Stein et.al. in U.S. Pat. No. 2,862,906 discloses a mass/suspension method of polymerization styrene having diene rubbers dissolved therein with the rubber being grafted, inverted and dispersed as rubber particles under agitation. After phase inversion, the viscous mixture is suspended in water and polymerization is completed producing a polyblend in the form of beads.

Such mass/suspension processes are used commercially, however, present the economic problems of batch operations requiring long cycles at relatively low temperatures to control the heat of polymerization. Continutous mass polymerization processes have great economic advantages if they can be run at higher temperatures and higher rates with the necessary control of the great heats of polymerization. In the case of polyblends, the dispersed rubber phase must be formed and stabilized as to its morphology bringing it through the continuous polymerization of the rigid matrix polymer phase so that the physical properties of the polyblend meet exacting property specifications.

Various methods have been developed for the continuous mass polymerization of polyblends. Ruffing et.al. in U.S. Pat. No. 3,243,481 disclose a process wherein diene rubbers are dissolved in predominantly monovinylidene aromatic monomers and polymerized in four reaction zones. Such processes require physically separated reactors providing different reacting conditions for each step of polymerization involving costly multiple reactors and specialized equipment.

Bronstert et.al. discloses in U.S. Pat. No. 3,658,946 a similar process wherein the prepolymerization step is run to a solids content of no more than 16% to provide a rubber particle having a particular structure. Bronstert discloses a need for separated nonstirred downstream reactors for final polymerization each providing a particular set of reacting conditions to insure final properties for the polyblend.

Accordingly, it is an objective of the present invention to provide a continuous process that will produce rubber modified polymeric polyblends having a matrix phase of predetermined average molecular weight and molecular weight distribution.

It is another objective of this invention to provide a continuous process wherein the rubber phase of the polyblend is dispersed as discrete rubber particles having a predetermined morphology wherein the rubber particles are grafted having an occluded matrix polymer phase and a particle size of 0.5 to 10 microns.

It is another objective of this invention to provide a continuous process for producing prepolymerization syrups having a stabilized dispersed rubber phase in an initial reaction zone and furthering the polymerization of said syrups in a second reaction zone by substantially linear flow through a staged isobaric stirred reactor having constant fillage and steady state polymerization.

The process of the present invention then accomplishes the above objectives and overcomes the problems of prior art processes by providing a continuous mass polymerization for polymeric polyblends with predetermined physical properties wherein reacting compositions of an alkenyl aromatic monomer having a diene rubber dissolved therein can be progressively polymerized with necessary property and heat control through two reaction zones minimizing the need for three and more reactors with extended conversion cycles and costly process equipment. The second reaction zone being operated so as to polymerize to relatively high conversions under liquid-vapor phase and shear-mixing conditions wherein linear flow and steady state polymerization is provided with isobaric temperature control. The second reacton zone operates at constant fillage for any predetermined molecular weight distribution. The fillage of the two reaction zones can be varied, however, along with other reaction conditions to provide a wide spectrum of molecular weight distributions as controlled by fillage, throughput rates and temperature. The present process of having a continuous initial prepolymerization reactor feeding a novel continuous staged, isobaric, stirred second reactor then provides for great versatility in producing a wide variety of polyblends having predetermined and controlled physical properties with a minimized number of reactors.

SUMMARY OF THE PROCESS

The present process relates to a continuous process for the production of high impact polymeric polyblends containing a dispersed grafted rubber phase by simultaneously practicing the following steps:

A. charging continuously to an initial continuous stirred isothermal reaction zone a monomer composition comprising at least one monoalkenyl aromatic monomer of the formula

where Ar is selected from the group consisting of a phenyl, halophenyl, alkylphenyl, alkylhalophenyl and mixtures thereof and X is selected from the group consisting of hydrogen and an alkyl radical of less than three carbon atoms having about 2 to 15% of a diene rubber by weight dissolved therein, B. maintaining reaction conditions in said initial continuous stirred isothermal reaction zone having a constant fillage of from 10 to 100% of its volume with said monomer composition such as to produce, a steady state polymerization of said monomer wherein about 10 to 50% by weight of said monomer is polymerized to a first polymer of a predetermined average molecular weight, at least a portion of said first polymer being grafted to said diene rubber and the remainder being dissolved in said alkenyl aromatic monomer as a monomer-polymer phase, said diene rubber and said grafted diene rubber being dispersed in said monomer-polymer phase as rubber-monomer particles having a weight average diameter of about 0.5 to 10 microns and having occluded therein a portion of said monomer-polymer phase, C. withdrawing continuously from said initial reaction zone said monomer-polymer phase having said rubber-monomer particles dispersed therein as a first mixture, D. charging continuously said first mixture to a first stage of a continuous staged isobaric stirred reaction zone having a plurality of stages so as to produce substantially linear flow through said stages downstream to a final stage, each of said stages operating at substantially constant gravimetric fillage of from about 15 to 90% of its volume of a polymerizing first mixture, E. maintaining conditions in said continuous staged isobaric stirred reaction zone as a second reaction zone so as to polymerize said first mixture by progressive multistage substantially linear flow polymerization, all said stages operating with shearing agitation and common evaporative vapor phase cooling under isobaric conditions in said second zone, providing each said stage with steady state polymerization at controlled temperature and interfacial liquid contact stage to stage establishing a pressure gradient from the first stage downstream to the final stage causing substantially linear flow through said second zone, all said stages operating at predetermined conversion levels producing a composite polymer as a second polymer in said second zone having a predetermined molecular weight distribution and average molecular weight, thereby maintaining the structural integrity of said rubber-monomer particle, said second zone producing a second mixture having a second polymer solids content being determined by said multistage steady state polymerization and evaporation of said monomers, f. withdrawing continuously said second mixture from said final stage, said second mixture comprising from about 50 to 90% by weight of said first and second polymers as a combined polymer having a predetermined molecular weight distribution, at least a portion of said first and second polymer being grafted to said diene rubber and the remainder being dissolved in said monomer-polymer phase, having about 2 to 15% of said diene rubber moiety dispersed in said monomer-polymer phase as grafted rubbermonomer particles having a weight average diameter of 0.5 to 10 microns, and having occluded therein a portion of said monomer-polymer phase, said combined polymers and said grafted diene rubber being separable as polymeric solids from a second mixture volatile phase, G. removing continuously a vapor phase evolved from said polymerizing first mixture in said staged isobaric stirred reaction zone at a rate sufficient to maintain the temperature of said first mixture at a predetermined temperature and under a predetermined isobaric condition, H. the withdrawing of said second mixture from said final stage being at a rate approximating the total rate at which all additions are made to all stages of said continuous staged isobaric stirred reaction zone, I. heating said second mixture at sufficiently elevated temperatures until said grafted rubber-monomer particles are crosslinked to a predetermined swelling index, J. separating said polymeric solids from said second mixture volatile phase wherein said polymeric solids comprise a polyblend of said combined polymers having dispersed therein crosslinked rubber particles having occluded and grafted first and second polymers present in an amount of about 0.5 to 5 grams for each gram of rubber and a weight average diameter of 0.5 to 10 microns.

DRAWINGS

FIG. 1 is a diagrammatic view of an apparatus assembly incorporating a continuous single stage stirred tank reactor as Reactor 1 and a continuous staged isobaric stirred reactor as Reactor 2 for the practice of the present invention into an embodiment of apparatus suitable for carrying out the present invention; and FIG. 2 is a diagrammatic vew of one preferred method of control of two variable fillage reactors as employed in the present invention.

DETAILED DESCRIPTION

Figure 1:
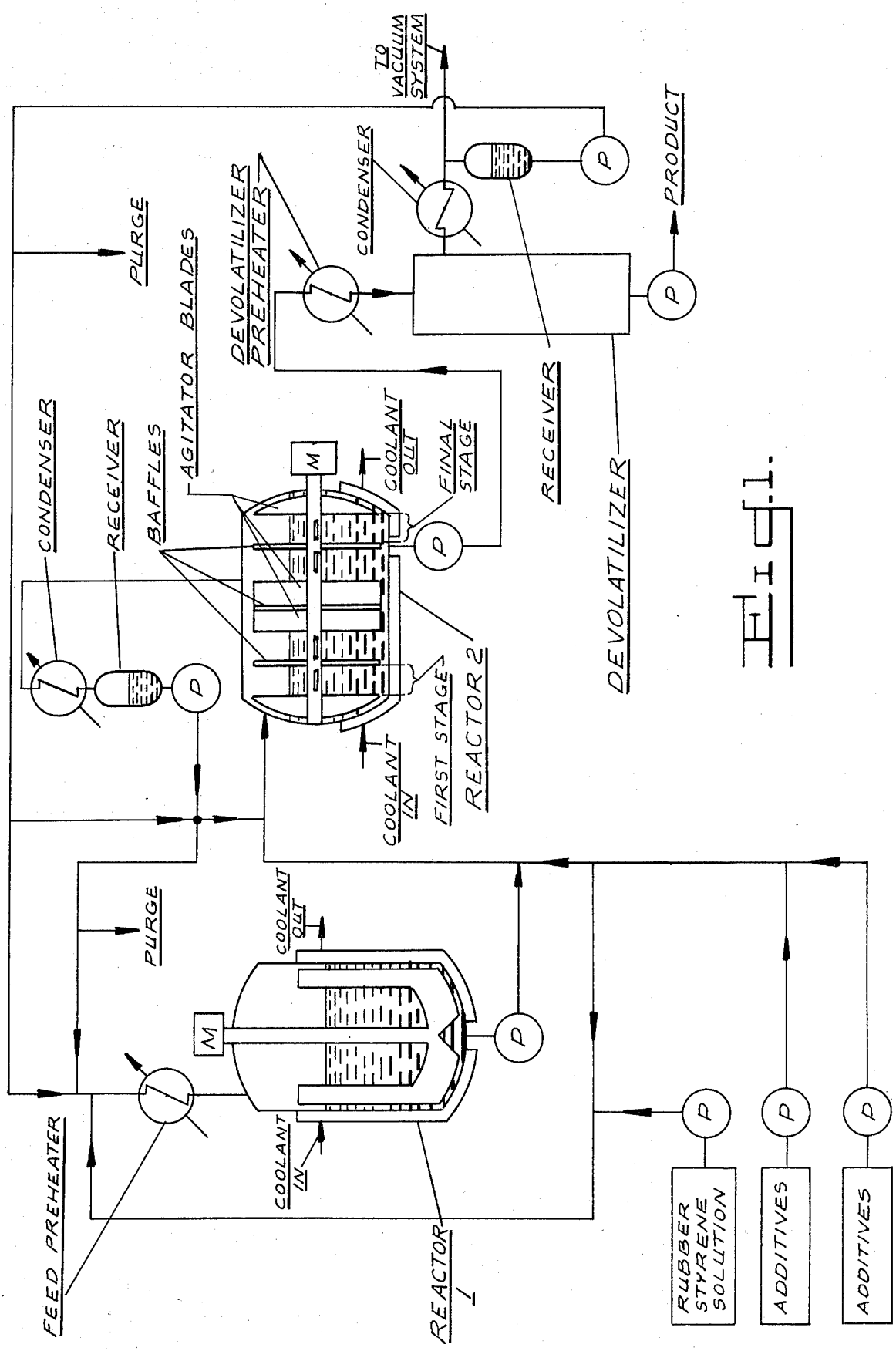

The process of the present invention involves the use of two variable fillage type stirred reactors for the polymerization of alkenyl aromatic monomers such as styrene to a wide variety of polymer molecular weight distribution and a wide range of production rates by the proper balancing of the conditions of polymerization and flow rates as between the initial and final reaction zones, represented in FIG. 1 by Reactors 1 and 2. The initial reaction zone as represented by Reactor 1 can comprise a continuous stirred tank reactor of any type adapted for variable fillage operation of from 10 to 100% preferably 30–60% of the volume thereof for the production of high molecular weight polyalkenyl aromatic polymers having a dispersed rubber phase wherein about 10 to 50%, preferably about 15 to 30%, of the monomer is converted to polymer. This continuous stirred tank reactor may be either horizontal or verticaal and may have provision for close control of the temperature therein by any desired means, including control by cooling jacket, internal cooling coils or by withdrawal of vaporized monomer followed by condensation thereof and return of the condensed monomer to the reaction zone. It will be apparent that such initial reaction zone can comprise more than one continuous stirred tank reactor operated in parallel if it is desired to employ several relatively small reactors to supply the capacity of the final reaction zone rather than a single large reactor for that purpose.

A preferred form of continuous stirred reactor which has been found quite suitable for carrying out the process is that general type illustrated in FIG. 1 wherein a tank reactor is provided with a heat exchanging jacket sufficient to remove any heat of polymerization not taken up by raising the temperature of the continuously charged monomer composition so as to maintain a preselected desired temperature for polymerization therein. Preferably also, such continuously stirred tank reactor will be provided with an anchor agitator driven by an external power source such as the motor indicated by the symbol M in FIG. 1. Other agitators such as turbine, propeller, helical, paddle or blade can be used. At least one of such agitators is positioned to provide shearing agitation to the liquid monomer composition contained in the reactor while operating at constant fillage, i.e. as low as 10% of the volume thereof, or at 100% fillage. Such a continuous stirred tank reactor can, if desired, be provided with additional features for improved efficiency of operation and safety, such as an additional reflux system or a series of internal cooling coils adapted to effectively prevent any "run-away" polymerizations if the normal holding period has to be extended for some reason and an outer jacket for additional cooling or heating of the contents of the reactor.

The continuous stirred reactor of the initial reaction zone is provided with an agitator that agitates the polymerizing monomer composition with sufficient shearing agitation throughout the mass to insure that the monomer-rubber phase added during the steady state polymerization of the monomer to a monomer-polymer phase is dispersed uniformly throughout the monomer-polymer phase as small rubber-monomer particles.

The second reaction zone is shown in a preferred form in FIG. 1 as Reactor 2 and is disclosed in a co-pending application, Ser. No. 398,722 (Attorney Docket No. C-08-12-0256), filed of even date herewith in the name of Robert E. Gordon et.al.

Reactor 2 is a continuous staged, isobaric, stirred reactor (SISR) adapted for operation in a substantially horizontal configuration at partial fillage levels and further adapted for the continuous mass polymerization of monomer-polymer solutions having a dispersed rubber-monomer phase which are fluid at reaction temperatures and pressures under substantially isobaric conditions in the presence of monomers vaporizable at such reaction conditions, said apparatus comprising:

a. a generally elongted, preferably cylindrical, enclosed vessel with input and output ports at opposite end regions thereof,
b. at least one shaft means extending generally longitudinally through said vessel and adapted for axial rotational movements relative thereto,
c. at least one disc-like baffle member, each such member (1) extending generally transversely across the interior of said vessel, (2) adapted to partition said vessel internally into stages, (3) being longitudinally fixed relative to said vessel and said shaft means, (4) defining at least during operation of said apparatus in horizontal configuration, aperture means between adjacent stages through both top and bottom portions of such member, the top aperture being adapted for passage of vapor, the bottom aperture being adapted for passage of the polymerizing first mixture,
d. agitator blade means functionally associated with said shaft means, positioned in each of said stages, and adapted to maintain the polymerizing first mixture partially filling said vessel in each of said chambers during operation of said apparatus in horizontal configuration in a generally uniform and homogeneous condition under shearing agitation,
e. drive means functionally associated with said shaft means and adapted to rotatably drive same during operation of said apparatus,
f. vapor removal means functionally associated with the upper portion of said vessel and adapted to remove vapors evolved from fluid in said vessel in each of said chambers during operation of said apparatus in horizontal configuration,
g. condition sensing means adapted to measure temperature, and/or pressure in at least one of said stages during operation of said apparatus and to convert the so measured value(s) into at least one condition signal representative thereof.
h. set point means adapted to generate a signal representative of a predetermined pressure and/or temperature desired in a predetermined one or more of said stages,
i. control means interconnected with said condenser means, said condition sensing means and said set point means and adapted to regulate the rate at which said condenser means condenses said vapors at a level such that the temperature and/or pressure in at least one of said chambers during operation of said apparatus in horizontal configuration is maintained with operating limits at a predetermined temperature and/or pressure, and
j. flow regulating means functionally associated with said input and/or output ports and adapted to maintain the average level of fluid in said vessel in each of said stages within predetermined limits.

The second reaction zone (SISR) zone operates with each stage at a substantially constant gravimetric fillage of about 15 to 90% of its volume, preferably 25 to 75% with the polymerizing first mixture solution and under steady state polymerization conditions at temperatures of from 130° to 180°C. preferably 150° to 170°C., and isobaric conditions of about 6 to 29 psia, preferably 10 to 23 psia.

The monomer-polymer solution flows through the SISR zone under substantially linear flow with minimized back mixing from the first stage to the final stage under a liquid pressure gradient from the first stage to the last stage. The aperture means are clearances between the disc members and the walls of the vessel. The clearances can increase in dimensions from the first stage to the last stage to insure linear flow as the viscosity of the polymerizing first mixture increases with conversion from the first stage to the last stage. These clearances are best expressed as a percent of the vessel radius and may be about 1 to 10% of the vessel radius depending on the throughput rates desired. Temperature in the SISR zone is controlled by pressure wherein the pressure is regulated to cause the polymerizing first mixture to boil under its heat of polymerization removing a monomer-vapor phase at a rate sufficient to maintain the temperature of the polymerizing first mixture at a temperature of from 130° to 180°C. and under isobaric conditions of 6 to 29 psia.

The monomer, e.g. styrene, polymerizes giving off about 300 BTU per pound polymerized. The heat of vaporization of styrene is about 150 BTU per pound vaporized, hence the SISR reactor generally removes about 2 pounds of monomer from the polymerizing syrup per pound of polystyrene converted which is recycled back to the polymerizing first mixture at that rate to maintain steady state polymerization under controlled temperature and isobaric conditions.

In operation of the present continuous mass polymerization process, great flexibility and range of choice can be realized in polymer types produced as well as the production rate thereof by proper choice of polymerization reaction conditions in both the initial and second reaction zones when continuously operated together. FIG. 1 illustrates the operation of the initial and second reaction zones of the present process and the manner in which such operation is incorporated into an overall polyalkenyl aromatic polymer polyblend production line. In operation a monomer composition comprising polyalkenyl aromatic monomers having 2 to 15% of a diene rubber dissolved therein as described above, and preferably styrene monomer, is charged to reactor 1 and the temperature thereof raised to from 110° to 140°C. to produce thermal polymerization thereof. Pressure in reactor 1 can vary from 1 to 150 psig or higher. It is preferred to operate reactor 1 at from about 5 to about 30 psig.

Figure 2:
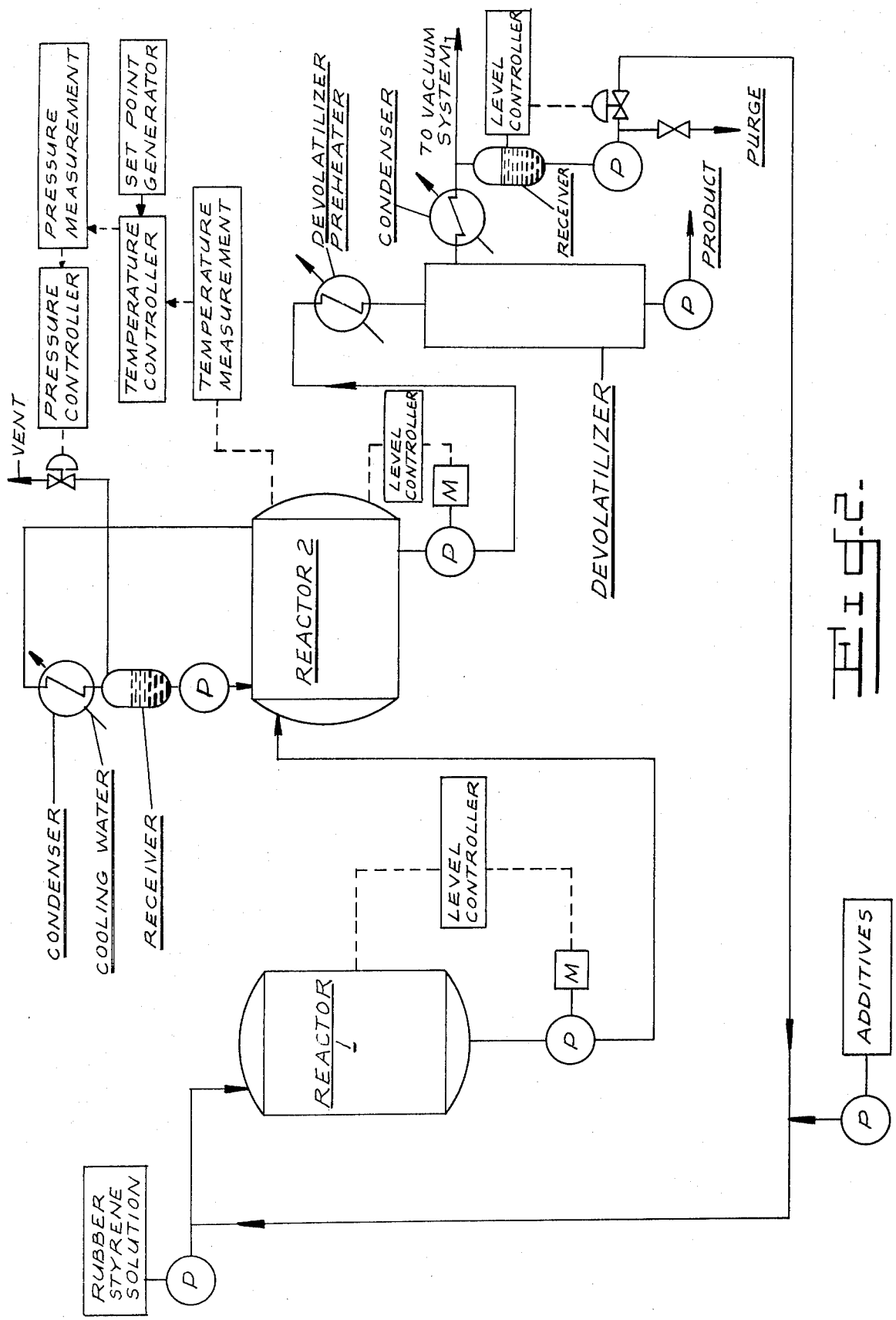

After charging reactor 1 with the monomer composition to the desired fillage level and polymerizing the monomer to approximately the desired conversion level of a first polymer, then the volume of monomer composition charged thereto is adjusted to a value to maintain such preselected fillage of the first mixture in reactor 1. Thereafter the first mixture is withdrawn from reactor 1, to maintain the preselected level of the first mixture in the initial reaction zone. Steady state polymerization conditions are contintuously maintained in reactor 1 to produce a first polymer of selected molecular weight and selected degree of conversion. The initial reaction zone can be operated so as to produce a first mixture having a first polymer concentration from as low as 10 percent to as high as 50 percent by weight, preferably 15–30%, with said first polymer possessing an average molecular weight ranging from 40,000 to 100,000 Staudinger, preferably 40,000 to 80,000. The level of fillage of reactor 1 can vary from as low as 10 percent to as high as 100 percent, preferably 30 to 60%, and may be controlled by any desired means, for example the level controller and associated valve in the transfer line from reactor 1 as shown in FIG. 2.

Any desired means of controlling the temperature within reactor 1 may be employed. It is preferred that the temperature be controlled by circulation of a cooling fluid such as cooling water through external cooling jackets in those reactors so equipped such as reactors of the type illustrated in FIG. 1. The entry of relatively cool monomer composition serves to remove a proportion of the heat of polymerization released and the external cooling jackets serve to remove the remainder so as to control the temperature of the liquid mixture therein to a preselected value and thus produce a polymer of the desired degree of conversion and average molecular weight.

To commence operation of the process it is generally preferred that both reactor 1 and reactor 2 are filled to the desired level with the monomer composition. The monomer composition is then brought to the desired polymerization temperature and polymerization is conducted with stirring until the desired degree of conversion is reached, i.e., until the rubber phase has dispersed and the liquid mixture of monomer and polymer reaches the desired percent solids content. On reaching substantially steady polyermization conditions in both reactors relative to temperature and conversion there is initiated the continuous withdrawal of a first mixture from reactor 1 by means of pumps of the gear or other type. Simultaneously with the continuous withdrawal of the first mixture from the first reactor is the continuous charging of the monomer composition to the first reactor at a rate sufficient to maintain substantially constant fillage of the first reactor. This first mixture is then transferred and charged continuously to the second reaction zone as represented by reactor 2 in FIG. 1. This second reaction zone is operated at a temperature of from 130° to 180°C. and pressures of 6 to 29 psia. Therein the first mixture is further polymerized producing a composite polymer as a second polymer contained in a second mixture. The composite polymer produced in the continuous staged isobaric reactor comprises those alkenyl aromatic polymers formed in each stage of the staged reactor as the polymerizing first mixture moves by substantially linear flow downstream from stage to stage to the final stage. The temperature increases stage to stage, hence the polymer formed in each stage has a slightly lower average molecular weight producing a composite polymer designated as a second polymer. The first polymer formed in the initial reactor zone is carried through the second reaction zone and is withdrawn in the second mixture with the second polymer. The first polymer and second polymer being designated as a combined polymer.

The second mixture is withdrawn continuously from the final stage of the second reactor at a rate approximating the total rate at which all additions are made to all stages of the second reactor. The second reactor, a staged isobaric stirred reactor, is operating under the conditions of step (E) using evaporative vapor phase cooling to control temperatures with the vapors being removed, condensed and returned to the second reactor as a feed material. Steady state polymerization conditions in both reactors are established under constant fillage by balancing the charging and withdrawing steps of each reactor and the conditions maintained in each reactor. The average residence time of the polymerizing mixture in the first reactor can vary from about 0.5 to 12 hours and from about 0.25 to 5 hours in the second reactor.

In operation, the second reaction zone can be filled from about 15 to 90% of its volume with the polymerizing, first mixture, the remaining volume thereof being occupied by vaporized monomers. A second mixture is withdrawn from the second reaction zone wherein the degree of conversion to said combined polymers can range from about 50% to as high as 90%. The second reaction zone is generally maintained at higher temperatures (130°–180°C.) than the initial reaction zone producing second polymers having average molecular weights in the lower range of 30,000 to 70,000 Staudinger. However, second polymers having an average molecular weight range from 40,000 to 100,000 Staudinger can be produced. The combined polymer of the second mixture comprising the first and second polymer can have molecular weight range of 30,000 to 100,000 Staudinger preferably 40,000 to 70,000 Staudinger. This flexibility affords the ability to produce a wide range of polymers of varying molecular weight distribution and at varying levels of fillage of both the initial and second reaction zones.

In the operation of the second reaction zone it is preferred to employ a continuous staged isobaric stirred reactor which is controlled by withdrawal of vaporized monomer above the liquid level maintained therein in order to control the temperature in such second reaction zone. This withdrawn stream of vaporized monomer is condensed in a condenser as shown in FIG. 1 and collected in a receiver. It can be returned either to the initial reaction zone or the seccond reaction zone, depending upon the polymer selected to be produced by the process. In some instances, particularly when a polymer of relatively high molecular weight and relatively narrow molecular weight distribution is desired, it is preferred that the withdrawn and condensed monomer stream be recycled to the initial reaction zone as shown in FIG. 1. Such recycle of monomer to the second reaction zone can produce generally higher molecular weight polymers at shorter holdup times in the second reaction zone if the temperatures are lowered.

As indicated above, the preferred type of reactor employed as the second reaction zone in the present process is a reactor which is adapted for control of temperature therein by means of withdrawal and recycle or reflux of a portion of the vapor phase of monomer above the liquid phase mixture of monomer and polymer in such reactor. Such a reactor can be operated at a somewhat lower range of pressure than the reactor comprising the initial reaction zone described above. Thus, in such a evaporatively cooled reactor the pressure maintained will closely approximate the equilibrium boiling point of the specific mixture of monomers and polymers contained therein. In the instance of the polymers produced by the present invention, such a pressure can range from 6 to 29 psia. When operated at or slightly below such equilibrium pressure the liquid phase present in the final reaction zone is expanded by the vaporization of monomer in such liquid phase. This expansion should be no more than that which will provide about 10% and preferably about 30% free volume in said second reactor for passage of said vapors.

A preferred method of control of the second reaction zone such as reactor 2 is illustrated in FIG. 2 of the drawing. As illustrated, the variable controlled is the temperature within the final stage of reactor 2. The control system shown involves sensing the temperature in the liquid phase in the final stage of reactor 2 and employing a signal so generated to control a temperature controller modified by a signal from a set point generator at a preselected temperature value. The resulting signal modified by a signal generated by sensing the pressure in the vapor phase of said reactor is employed to control a pressure controller which in turn controls a pressure valve in the vent line from the recycled condensed monomer receiver. By so adjusting the pressure above the condensed monomer in the receiver the temperature of the final stage in reactor 2 is very closely and rapidly controlled to a preselected desired value. The temperature in each stage rapidly achieves an equilibrium value based on the reactor pressure and the polymeric solids content of the polymerizing first mixture in each stage. As shown in FIG. 2 the liquid level in the condensed monomer receiver is utilized to control the recycle rate of the liquid contents of said receiver to reactor 1 by means of the valve shown. Such recycle rate is controlled by the liquid level in the receiver which in turn is controlled by the rate of withdrawal of the vaporized monomer to reactor 2 controlled as above outlined.

The utilization of the present process in an overall production process for high impact strength polyalkenyl aromatic polyblends is shown in FIG. 1. The polymer, dispersed rubber and monomer mixture called the second mixture comprises the liquid phase effluent from reactor 2. Said second mixture having a polymeric solids content of from about 50 to about 90% by weight is withdrawn therefrom by suitable means such as a gear pump and passed to a heating and devolatilization zone or zones.

In FIG. 1 there is illustrated one zone of devolatilization which can be operated at pressures below atmospheric, or degrees of vacuum. However, the process of the present invention can be operated by the use of two or multiple zones of devolatilization as desired. In the process outlined the vaporized alkenyl aromatic monomers as well as low oligomers thereof are removed from the first devolatilization zone, condensed and passed to a receiver. From the receiver a stream of the condensed monomers and oligomers can be recycled to reactor 2 as shown, or, if preferred, to reactor 1. Likewise, the monomers and oligomers vaporized in a second devolatilization zone generally operated at somewhat lower pressure than the first are withdrawn, condensed and passed to a receiver. From this receiver a stream of condensed monomers and oligomers can also be recycled to either reactor 1 or 2 as shown. Preferably, the oligomers vaporized in either devolatilization zone can be separated from the vaporized monomer by distillation and separately recycled to a reaction zone or purged from the procoess.

In the production of certain of the desired polymers it has generally been found advantageous to add certain high boiling organic compounds to the polymers produced and the addition is preferably made during polymerization. These additives include internal lubricants such as mineral oil or other heavy oil and mold release agents such as fatty acids, fatty acid esters or salts and waxes. These additions can be conveniently made to either reaction zone but are preferably made to reactor 2 as shown in FIG. 1 by means of the multiple metering pumps there shown. Making such additions to reactor 2 facilitates chaning the polymer product mix without shutting down or cleaning reactor 1. In any event, it is necessary for economic reasons to be able to recover the relatively high boiling additives and recycle them to the process. Such additives are generally recycled to either zone of reaction together with the oligomers in a stream of condensed monomer when such oligomers have been concentrated from the vaporized monomers or alternatively, with the condensed and recycled monomer streams. In the present process it is preferred that the oligomers and additives be concentrated in a stream of condensed monomer rich in oligomers and additives and that such stream be recycled to the final reaction zone while a separate stream of condensed monomer substantially free of oligomers and additives be recycled to the initial reaction zone from the devolatilization zone or zones.

When operating in the manner described above, the proper control of an initial reaction zone and a second reaction zone both comprising reactors of the variable fillage type affords one the extremely useful advantage of ability to produce polymers of specific physical properties and molecular weight distribution over a range of capacities of from as low as 30 to as high as 100% of design capacity for the single production facility described. This flexibility in useful capacity is highly desirable to afford ready response to changes in market demand for total polymers or in the market percentage for various polymers produced in such a production facility.

POLYMERIZABLE MONOMER COMPOSITION

The monomer composition charged to the first reaction zone comprises at least one monoalkenyl aromatic monomer of the formula

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

In addition to the monomers to be polymerized, the formulation can contain catalyst where required and other desirable components such as stabilizers, molecular weight regulators, etc.

The polymerization may be initiated by thermal monomeric free radicals, however, any free radcial generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-dimethyl-2,5-di-(tert-butylperoxy) hexane, 2,5-dimethyl-2,5-di(tert-butylperoxy) hexane-3 or hexyne-3, tert-butyl hydroperoxide, cumene hydroperoxide, p-menthane hydroperoxide, cyclopentane hydroperoxide, pinane hydroperoxide, 2,5-dimethylhexane-2,5-dihydroperoxide, etc., and mixtures thereof.

The catalyst is generally included within the range of 0.001 to 3.0 percent by weight, and preferably on the order of 0.005 to 1.0 percent by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0 percent by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirble to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

THE RUBBER SUBSTRATE

Exemplary of the various rubbers onto which the polymerizable monomer formulation can be grafted during polymerization in the presence thereof to produce the graft copolymers are diene rubbers, natural rubbers, ethylene-propylene terpolymer rubbers, acrylate rubbers, polyisoprene rubbers, and mixtures thereof, as well as interpolymers thereof with each other or other copolymerizable monomers.

The preferred substrates, however, are diene rubbers (including mixtures of diene rubbers), i.e., any rubbery polymer (a rubbery polymer having a second order transition temperature not higher than 0° centigrade, preferably not higher than −20° centigrade, as determined by ASTM Test D-746-52T) of one or more of the conjugated, 1,3dienes, e.g. butadiene, isoprene, 2-chloro-1,3-butadiene, 1 chloro-1,3-butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl - 4 - chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; arcylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halidies (e.g. the vinyl and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addidion. Mooney viscosities of the rubber (ML-4, 212°F.) can range from about 20 to 70 with a second order transition temperature of from about −50° to −105°C. as determined by ASTM Test D-746-52T.

GRAFTED RUBBER PHASE

A monomer composition comprising at least one monoalkenyl aromatic monomer having about 2–15% by weight of a diene rubber dissolved therein is charged continuously as a monomer-rubber solution to the initial reaction zone. The monomer is polymerized at temperatures of about 110°–145°C. in the first zone converting about 10–50% by weight of the monomer to a alkenyl aromatic polymer, already described, as a first polymer. At least a portion of the first polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

The remainder of the first polymer formed is dissolved in said monomer composition as polymerized forming a monomer-polymer solution. The monomer-polymer solution or phase is imcompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence must be controlled to provide sufficient stirring to size the particles to the predetermined size needed and insure homogeneous dispersion.

At steady state polymerization, in the initial polymerization zone, the continuously charged monomer composition containing 2 to 15% by weight diene rubber disperses almost instantaneously, under stirring, forming the rubber-monomer particles which on complete polymerization form discrete rubber particles. The conversion of monomers to polymers in the first reaction zone is controlled between 10–50% and must have a weight percent level that provides a polymer content in excess of the rubber content of the monomer composition to insure the dispersion of the monomer-rubber phase to a rubber-monomer particle phase havng a predetermined size and being dispersed uniformly throughout the monomer-polymer phase.

The rubber particle becomes grafted with a first polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 2 to 15% as used in the present invention. The impact strength is also determined by the size of the dispersed rubber particles, with the larger particles providing higher impact strength in the range of 0.5 to 10 microns measured as a weight average particle size diameter with a photosedimentometer by the published procedure of Graves, M. J. et.al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market Street, Louisville, Kentucky was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersibility in the monomer-polymer phase.

The initial reactor forms a first mixture of a monomer-polymer phase having the rubber phase described dispersed therein. The first mixture is charged to a staged isobaric stirred reaction zone as a second zone and described above. The first mixture is polymerized by progressive multistage substantial linear flow polymerizations with the conversion of polymer advancing from about 10–50% conversion in the first stage to 50 to 90% conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

It has been found unexpectedly that in the initial reaction zone as the rubber particle is formed, that the rubber-monomer particle has a monomer content that corresponds to the monomer content of the monomer-polymer phase. The rubber-monomer particle will stabilize at this level as the monomer polymerizes inside the rubber particle and grafted polymer is formed on the outside. Hence, it has been found that the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage less monomer is occluded in the rubber phase particle on dispersion. As described earlier, the first mixture is polymerized in the staged linear flow second zone, and the percent by weight of polymer being formed is progressively higher with each stage having a slightly higher polymer content. The staged linear progressive polymerization was found not only to control the polymerization of the monomer giving desirable polymers but was found unexpectedly to preserve the integrity of the rubber particles. Although not completely understood, as the rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the rubber particle and the monomer-polymer phase at about the same rate, hence the total polymer content of the occluded monomer-polymer phase of the rubber particle is about the same as polymer content of the monomer-polymer phase and monomer is not extracted, hence the weight percent of occlusion is stabilized and remains substantially constant after formation in the initial reactor.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50°C. for 12 hours and weighed as a dry gel.

$$\text{\% Dry gel in Polyblend} = \frac{\text{Weight of dry gel}}{\text{Weight of polyblend}} \times 100$$

$$\text{\% Graft and Occlusions in Rubber} = \frac{\text{\% dry gel} - \text{\% rubber}}{\text{Percent rubber*}} \times 100$$

$$\text{Parts** by weight of graft polymer and occluded polymer per unit weight of rubber} = \frac{\text{\% dry gel} - \text{\% rubber}}{\text{Percent rubber}}$$

*Percent rubber determined by infra-red spectrochemical analysis of the dry gel

**The present invention preferably has present about 0.5 to 5 grams of occluded and grafted polymer per gram of diene rubber particle.

The swelling index of the rubber graft particles is determined by taking the dry gel above and dispersing it in tolutene for 12 hours. The gel is separated by centrifuge and the supernatant toluene drained free. The wet gel is weighed and then dried in a vacuum oven for 12 hours at 50°C. and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle during steps (B), (E) and (I). Generally, the conversion of monomer to polymer in the occlusion follows the rate of conversion of monomer to polymer in the monomer-polymer phase being carried out in steps (B) and (E). In step (I) the temperatures of the second mixture is raised to about 200° to 250°C. and the monomer vapors are separated in step (J) to give a finished polyblend. The rubber particles become crosslinked by heating the second mixture to from about 200° to 250°C. for sufficient time to crosslink the rubber particles such that they have a swelling index of from about 7 to 20 preferably from about 8 to 16.

Preferably, the combined polymer of the matrix phase of the polyblends produced by this invention have a dispersion index (Mw/Mn), wherein Mw is a weight average molecular weight and Mn is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The average molecular weight of the combined polymer of the matrix phase preferable range from 40,000 to 70,000 Staudinger.

SECOND REACTION ZONE POLYMERIZATION

The second reaction zone polymerization is carried out in a staged isobaric stirred reaction zone maintaining conditions so as to polymerize said first mixture by progressive multistage substantially linear flow polymerization all said stages operating with shearing agitation and common evaporation vapor phase cooling under isobaric conditions in said second reaction zone, providing each said stage with steady state polymerization at controlled temperature and interfacial liquid contact stage to stage establishing a hydraulic pressure gradient from the first stage downstream to the final stage causing substantially linear flow through said second zone, all said stages operating at predetermined conversion levels producing a composite polymer as a second polymer in said second reaction zone having a predetermined molecular weight distribution and average molecular weight maintaining the structural integrity of said dispersed rubber particle, said second zone producing a second mixture having a total polymer content being determined by said multistage steady state polymerization and evaporation of said monomers.

The reactor operates under controlled isobaric conditions. For the range of temperatures normally of interest for alkenyl aromatic monomers, e.g. styrene polymerization, the operating pressure will range from 6 to 29 psia. The styrene reaction is exothermic, and cooling is provided primarily by vaporization of a part of the monomer from the reacting mass. Further cooling can be provided by jacket as shown in FIG. 1. Cooling by the condensed recycle monomer feeding into either the first or second reaction zone is also provided. The mass is in a boiling condition, and temperature is determined by the natural relationship between vapor pressure and boiling point. This relationship is also a function of the relative amounts of polymer, monomer, and other substances (e.g. dissolved rubber, solvents, and additives.) Since, as material progresses through this reactor, the amount of poolymer continuously increases and the amount of monomer corresponding decreases via polymerization, and monomer content further decreases due to vaporization loss, the temperature progressively increases from inlet to outlet stages.

To accommodate the natural swell of the boiling mass, and to provide space for vapor disengagement, the reactor is usually run at a fillage of about 10 to 90% preferably 40 to 60% of its volume.

Vapor passes out of the reactor to an external condenser where it is condensed and may also be subcooled. This condensate may then be handled in several ways, for example:
1. If the reactor used this invention is preceded by another reactor in a multi-reactor train, the condensate may be returned to a preceding reactor.
2. The condensate may be returned to the inlet compartment of the reactor used this invention, wherein it is reheated by condensation of a fraction of the previously evolved vapors and mixed other incoming free materials.

In a multi-compartment staged reactor, each stage is well mixed, and the reaction mass is substantially homogeneous within itself. The discs which separate the stages discourage backflow of material between compartments. The clearance between disc and shell does permit some backflow, and also permits the necessary forwarding of material through the compartments from reactor inlet to outlet giving substantially linear flow.

In a compartmented staged reactor as here described, the first stage has a relatively low conversion level, since it is being continuously fed by monomer and low conversion prepolymerized syrup. However, the rate of conversion in this stage is relatively high because of the high concentration of monomer.

In each succeeding stage, the conversion level is higher than in the preceding one, which tends to lower the rate of conversion. Offsetting this effect, however, are the facts that the temperature is higher, and that monomer is being vaporized out of the mass. Thus, the total conversion to polymer obtained per unit fillage volume of the staged reactor is higher than that which could be obtained in a single stage reactor producing an equal final conversion level at equal temperature.

Clearance between rotating disc compartment baffles and cylindrical wall may be from 1 to 10% of shell radius, the larger values being appropriate to the high conversion end of the reactor where viscosity is at maximum. Stage to stage forward flow of the polymerizing first mixture is through this clearance, and vapor from the polymerizing first mixture also counterflow through the clearance, above the surface level of the mass.

The following examples are set forth to illustrate more clearly the principles and practice of this invention to one skilled in the art. They are not intended to be restrictive but merely illustrative of the invention herein described. All parts are by weight unless otherwise indicated. All molecular weights are in Staudinger values unless otherwise noted.

EXAMPLE 1

A monomer composition consisting of 8 parts by weight of stereospecific polybutadiene rubber in 92 parts by weight of styrene monomer is prepared by agitating the mixture at 40°C. for 8 hours. the rubber used contains approximately 35% cis-1,4 structure; approximately 55% trans-1,4 structure, and approximately 10% vinyl-1,2 structure having a Mooney viscosity of the rubber (ML-4, 212°F.) at 55. To the above monomer composition is added 0.5 parts of white mineral oil, 0.1 part by weight of octadecyl 3-(3', 5'-di-tertbutyl-4-hydroxyphenyl) propionate and 40 parts by weight of recycled styrene monomer. This monomer composition is fed continuously at approximately 145 lbs./hr. to a 100-gal. anchor-agitated initial reactor operated at approximately 50% fillage and 124°C. under 5 psig. nitrogen pressure. The agitator is approximately 31 inches wide and turns at 65 rpm. A first mixture containing approximataely 18% polystyrene is pumped from the above reactor at a continuous rate such as to maintain essentially constant fillage therein and flows to the inlet of the second reactor, a staged isobaric stirred reactor. The second reactor has approximately a 50 gal. capacity and operates at about 40% fillage.

The reactor is about 53 inches long. The agitator consists of a horizontal shaft on which are fixed a series of paddles about 2 inches wide alternating at right angles to one another in a manner similar to that shown in FIG. 1. Along the shaft and rotating with it are four circular discs with an average radial wall clearance of about three-eighth inch rotating at 15 rpm. These discs are positioned to divide the reactor into five stages of approximately equal volume. The pressure in this reactor is maintained at approximately 20 psia.

The second mixture in the final stage is maintained at about 166°C. and contains about 62% polystyrene. Styrene vapor evaporated from the second reactor is condensed and the condensate is returned to the first compartment. The second mixture is pumped continuously from the final stage at a rate to maintain essentially constant fillage in the second reactor and is delivered to the inlet of the devolatilizer preheater. The second mixture exits from the preheater at approximately 240°C. and enters a devolatilizer chamber maintained at 50 torr. Second mixture volatile vapors exiting the devolatilizer chamber are condensed and recycled to the first reactor preheater feed system. Approximately 3 lbs./hr. of the condensed devolatilized vapors are withdrawn as purge. The deveolatilized melt is fed from the devolatilizer chamber to an extruder which forms it into a plurality of strands which are then cooled and cut into pellets. The combined polymer has a Staudinger molecular of about 51,000 and a dispersion index about 3.1.

| Typical Properties | |
|---|---|
| Izod Impact ½" × ½" bar 73°F. (ft.lb./in.) | 1.3 |
| Tensile strength at yield (lb./in.) | 3800 |
| Tensile strength at fail (lb./in.) | 3750 |
| Tensile elongation at fail (%) | 62 |
| Swelling index | 9 |
| Parts graft and occlusions/rubber | 1.43:1 |
| Rubber particle size (microns) | 1.5 |

It is to be noted that the first reactor was run at 124°C. and the second reactor at about 166°C. with the first reactor making a higher average molecular weight first polymer and the second reactor making a lower average molecular weight second polymer. The preheater of the separator step was run at 240°C. causing crosslinking of the rubber phase giving the rubber phase a swelling index 9. Some low molecular polymer may be formed during the heating and separation steps. The combined polymer of the rigid phase is found to have an average molecular weight of about 51,000 Staudinger and a dispersion index of 3.1 representative of the molecular weight distribution. The rubber particles have a desirable morphology having a particle size of 1.5 microns and having a graft and occlusion level to rubber ratio of 1.43 to 1.0.

EXAMPLE 2

Monomer Composition Having Lower Rubber Content

Using the apparatus and procedure of Example 1, except where noted, the process was operated as follows:
a. The feed monomer composition contains about 3.5 parts of rubber and 96.5 parts styrene.
b. The first mixture stream from the 100 gal. reactor contains approximately 19% polystyrene, operating at steady state polymerization.
c. The second reactor run at 167°C. and 19.3 psia.
d. The second mixture from the second reactor contains approximately 65% polystyrene operating at steady state polymerization.
e. The second mixture from the devolatilizer preheater is approximately 230°C.
f. The polymer solids were separated from the second mixture volatile phase as a polyblend.

| Typical Properties of the Polyblend | |
|---|---|
| Izod Impact ½" × ½" bar 73°F. (ft.lb./in.) | .75 |
| Tensile strength at yield (lb./in.²) | 5000 |
| Tensile strength at fail (lb./in.²) | 4700 |
| Tensile Elongation at fail(%) | 42 |
| Swelling index of rubber phase | 12 |
| Rigid phase combined polymer Staudinger molecular weight | 52,000 |
| Rigid phase polymer dispersion index | 2.8 |
| Rubber particle size (microns) | 1.8 |
| Parts graft and occlusions/parts rubber | 1.44 to 1.0 |

It is to be noted that the rubber level charged was lower being 3.5% versus 8.0% giving a lower impact strength of 0.75 ft.lbs./in. The preheater was run at 230°C. versus 240°C., and the swelling index was higher being 12 versus 9 at 240°C., showing less crosslinking of the rubber phase as the temperature is lowered. A lower level of rubber gives a lower elongation at fail being 42 versus 62. Tensile strength at yield and fail increases because the filler content of the rubber decreases. The dispersion index was found to be 2.8 and the average molecular weight to be 52,000 Staudinger showing a slightly narrower molecular weight distribution and higher average molecular weight corresponding to the lower temperatures used in the heating step. Hence, polyblends can be tailor made to have certain critical physical properties showing the versatility of the process to change and control these properties either by varying the composition or the operating conditions or both. It is evident that the staged, isobaric stirred reactor preserves the morphology of the rubber particles giving rubber particles of the desired size and having desirable graft and occlusion levels contained in the rubber phase over a range of rubber concentrations in the monomer composition.

EXAMPLE 3

Lower Process Temperatures Versus Molecular Weight

Using the apparatus and procedure of Example 1, except where noted, the process was operated as follows:
a. The 100-gal. first reactor is operated at 112°C. and about 86% fillage,
b. The second reactor is operated at about 16 psia., 52% fillage, and the final stage syrup is at about 157°C.
c. Polyblend rigid phase Staudinger molecular weight is about 57,000 and dispersion index is about 3.5.
d. Typical Product Properties of Polyblend

| | |
|---|---|
| Izod Impact ½" × ½" bar, 73°F. (ft.lb./in.) | 1.4 |
| Tensile strength at yield (lb./in.²) | 3850 |
| Tensile strength at fail (lb./in.²) | 3750 |
| Tensile elongation at fail(%) | 45 |
| Swelling index | 9 |
| Rubber particle size (microns) | 1.50 |
| Parts graft and occlusions/parts rubber | 1.30 |

It is to be noted that the first reactor was run at 112°C. and the second reactor at 157°C. relative to Example 1 with corresponding temperatures of 124°C. and 166°C. This produces higher molecular weight first and second polymers respectively producing a combined polymer with an average molecular weight of 57,000 versus 51,000 in Example 1. The dispersion index was 3.5 showing a broader molecular weight distribution reflecting a greater temperature differential between the two reactors. The preheater was again run at 240°C. producing a swelling index of about 9 as in Example 1. The process of this invention then can tailor make the molecular weight properties desired by adjusting the operating conditions in the two reaction zones yet preserving the morphology of the rubber particles at desired levels.

EXAMPLE 4

Reactor Fillage Versus Output

Using the apparatus and procedures of Example 1, except as noted, the process was run at lower but constant fillage to demonstrate the capability of the process to vary output yet produce polyblend products having great utility but at varying rates depending on product need. Commercially the stopping and starting of continuous processes is costly because of the time needed to reach steady state conditions. The present process can be adjusted readily "on-stream" to produce different polymers or less or more polymer as needed. It can be readily understood that one could run at low fillages and higher temperatures to produce low molecular weight polymers at high rates. Also, one could run at higher fillages and lower temperatures to produce more pounds of higher molecular weight polymer at high rates.

Using the procedures and conditions of Example 2, except when noted, reactor 1 and reactor 2 were run at relatively low fillage and the process operated as follows:

a. Monomer composition solution fed to the 100-gal. first reactor is about 100 lbs./hr.
b. Fillage of the 100-gal. first reactor is about 35%.
c. The second reactor is operated at about 30% fillage.
d. The second mixture from the devolatilizer preheater is about 225°C.
e. The polyblend was separated from the second mixture volatile phase.

The polyblend obtained had the following properties:

| | |
|---|---|
| Izod Impact (ft.lbs./in.) | 0.75 |
| Tensile strength at yield (lbs./in.$^2$) | 5100 |
| Tensile strength at fail (lbs./in.$^2$) | 4750 |
| Tensile elongation at fail(%) | 40 |
| Swelling index of rubber | 11.0 |
| Rigid Phase Combined Polymer Dispersion Index | 2.9 |
| Rigid Phase Combined Staudinger Molecular Weight | 47,000 |
| Rubber Particle Size (microns) | 1.7 |
| Parts of graft and occlusions per parts of rubber | 1.45:1 |

It is evident that the process can operate at lower fillage, as compared to Example 2, yet produce a polyblend of about the same properties. The preheater was run at slightly lower temperatures to keep the swelling index in a desirable range as the dwell time in the heater would be longer at lower throughput rates.

PROCESS CONTROL OF RUBBER PARTICLE MORPHOLOGY IN THE SECOND REACTION ZONE

Example 5

CONTROL

A process comparison was made using two reactors both being single stage continuous stirred tank reactors (SSCSTR). The replacing of the continuous staged isobaric stirred tank reactor (CSISR) with the (SSCSTR) gave a rubber particle having lower than desirable amounts of grafting and occlusions being about 0.93 as compared to a preferred level of 1:5 parts to 1 part of rubber. This example demonstrates the problem of preserving the morphology of the rubber particles. When one charges the rubber dispersions from a (SSCSTR) having a conversion of 27% into a second (SSCSTR) that is operating at a conversion level of 64% the rubber particles lose occluded styrene monomer to the monomer-polymer phase by extraction lowering the level of occlusions in the final rubber particle. Examples 1–4 using a (SSCSTR) feeding a (CSISR) demonstrate that the (CSISR) operating with the first stage conversion at about the same level of conversion as the charged material from the (SSCSTR) does not extract the monomer occluded in the rubber particle. As the polymerizing first mixture moves through a plurality of stages by substantially linear flow the polymerization environment for the rubber particle is only gradually changed and the monomer in the rubber-monomer particle polymerizes at about the same rate as in the monomer-polymer phase preserving higher levels of graft and occlusions per parts of rubber.

A monomer composition containing 6 parts of the rubber described in Example 1 dissolved in 94 parts of styrene is charged at a rate of 90 lbs./hr. to a first (SSCSTR) maintained at 135°C. and approximately 27% polystyrene. The first mixture from this reactor is fed to a second (SSCSTR) maintained at 160°C. and 64% polystyrene. The second mixture from the second reactor flows to a preheater and devolatilizer. The devolatilized styrene is condensed and recycled to the first reactor. The devolatilized polymeric solids are formed into pellets which have the following properties:

| | |
|---|---|
| Izod Impact (½" × ½") | .9 ft.lb./in. |
| Staudinger Molecular Weight of Combined Polymer | 48,000 |
| Rubber particle size, Dw | 1.7 microns |
| Parts graft and occlusions/parts rubber | .93 |

EXAMPLE 6

Present Process

Example 6 below was run much as Example 5 using a (CSISR) in place of a second (SSCSTR) to demonstrate the novel process of this invention. It is to be noted that the parts graft and occlusions per parts of rubber is at a ratio of 1.43 to 1 as compared to 0.93 for Example 5.

The feed monomer composition of Example 5 is fed at 102 lbs./hr. to the (SSCSTR) of Example 5 maintained at 135°C. and approximately 25% polystyrene. The first mixture from this reactor is fed to a (CSISR) similar to the second reactor of Example 1. The effluent from the second reactor is at 165°C. and contains approximately 66% polystyrene. This second mixture flows to a preheater and devolatilizes and the devolatilized styrene is condensed and recycled to the first reactor. The devolatilized polymeric solids are formed into pellets having the following properties:

| | |
|---|---|
| Izod Impact (½" × ½") | 1.1 ft.lb./in. |
| Staudinger Molecular Weight of Combined Polymer | 48,000 |
| Rubber particle size, Dw | 1.9 microns |
| Parts graft and occlusions/parts rubber | 1.43 |

SECOND ZONE POLYMERIZATION EFFICIENCY OF A (CSISR) VERSUS A (SSCSTR)

Example 7

SECOND ZONE (CSISR)

A first mixture from a first (SSCSTR) operating at 124°C. containing approximately 5.6% rubber described in Example 1 and 19% polystyrene is fed at 141 lbs./hr. to a second reactor consisting of a (CSISR) divided into seven stages. The fillage used in this second reactor at steady state is approximately 132 lbs., and the second mixture exiting the downstream compartment is at about 166°C. and contains polymeric solids of about 62% polystyrene and 5.6% rubber. Reactor pressure is about 20 psia. The combined polymer of polystyrene has a Staudinger Molecular Weight of about 51,000. Example 8 below demonstrates the lower efficiency of (SSCSTR) type reactors.

EXAMPLE 8

Second Zone (SSCSTR)

A first mixture from a (SSCSTR) similar to that described in Example 7 is fed at 141 lbs./hr. to a second (SSCSTR). This reactor is operated at steady state at 165°C. and a second mixture is formed having a polymeric solids content similar to that of the syrup in the downstream compartment of the reactor described in Example 7. It was found that the fillage of the (SSCSTR) had to be run at about 147 lbs. to provide the same percent polymeric solids in the second mixture exiting from the second reactor. Hence, the staged isobaric stirred reactor can produce the same percent polymeric solids in Example 7 with about 11% less gravimetric fillage than a continuous stirred tank reactor operating under the same conditions. This capability is based on the fact that the styrene monomers are being removed from the downstream stages where the rates of polymerization are relatively slow and bringing them back to the first state where the polymerization rates are relatively high. Also, this capability is based on the fact that the (CSISR) second stage process provides for a higher rate of conversion of monomer to polymer in the earlier stages providing an overall higher conversion rate for a miltistage reactor than a single stage reactor operating at the same final conversion level. Hence, the (CSISR) converts more monomer to polymer per unit volume and fillage of reactor. The present process then of using staged isobaric and stirred polymerization to realize higher overall polymerization rates for a single reaction zone was found to be novel providing a process of great utility in the manufacture of polyblends.

POLYMERIZATION EFFICIENCY OF STAGED ISOBARIC STIRRED PROCESS AT HIGHER CONVERSIONS

Example 9

SECOND ZONE (CSISR)

A first mixture from a first reaction zone as described in Example 1 and operating at 124°C. containing approximately 6.5% rubber and 22% polystyrene is fed at 123 lbs./hr. to a second zone (CSISR) divided into seven stages. At steady state the fillage of the second zone is approximately 146 lbs. and the first mixture entering the first stage is 124°C. and second mixture exiting the downstream stage is at about 174°C., contains about 71.5% polystyrene and 6.5% rubber. Reactor pressure is about 20 psia and the combined polymer of polystyrene has a Staudinger molecular weight of about 50,000.

Example 10

SECOND ZONE (SSCSTR)

A first mixture similar to that described in Example 9 is fed at 123 lbs./hr. to a (SSCSTR). This reactor is operated at steady state at 162°C. and a second mixture similar to that of the second mixture exiting the downstream compartment of the reactor described in Example 9. It was found that the fillage of this reactor had to be about 284 lbs., approximately 94% higher than that of the reactor of Example 9 to produce the same final level of conversion. Example 10 using a single stage continuous stirred tank reactor process instead of a staged isobaric reactor process of this invention as a second zone demonstrates that such a process requires roughly twice the fillage volume in the reactor to produce to same conversion level in the second mixture meaning that the polyrate is about 50% of a staged reactor process both running at the same throughput. The volume efficiency of the staged reactor process was unexpectedly high. Also the ability of the process to maintain the morphology of the rubber particle through its progressive staged polymerization has made the process of great utility in the production of rubber reinforced polymeric polyblends.

EXAMPLE 11

Linear Flow Characteristics

A STAGED ISOBARIC STIRRED REACTOR

Using the feed materials, procedures and apparatus of Example 1, except where noted, a first mixture from reactor 1 was fed to the SISR reactor operating at 161°C., in the final stage and with an agitator speed of 25 rpm. The rotating baffles in the reactor were varied in number and location to determine their effect on the level of conversion reached in each stage of the reactor. Three configurations were used having 3, 5 and 9 stages. The reacting mixture was analyzed in each stage for percent solids after steady state polymerization was reached in the reactor. The percent solids correlates with the level of conversion found in each stage.

A first run using 3 stages or chambers was made. The chambers varied in length with the first being about 29.5 inches long, the second about 11 inches and the third about 12.5 inches. The solids level in the corresponding chambers was about 37.5%, 49.5% and 72%. The first mixture from the initial reactor entering the first chamber had about 26% solids of which 8% was rubber and 18% polystyrene. It is evident that the level of conversion in each compartment is increasing showing a net forwarding of materials or flow through the reactor even though some back mixing can occur. This net forward flow demonstrates that the reactor has a net linear flow defined as substantial linear flow in the present invention. Those skilled in the art will recognize that if the flow was not substantially linear, the percent solids in each stage would be about same, characteristic of a single stage reactor. As already discussed, it is important in the present invention that the first mixture be charged to a substantially linear flow, staged second reaction zone or the rubber particle will lose a portion of its monomer phase and have a lower level of occlusions.

A second run was made using 5 stages of about 30, 5, 5, 5, and 8 inches respectively. The solids content was measured as 36.5% in the first stage, 49.5% in the third stage and 72.0% in the fifth stage showing a net forward flow and substantially linear flow through the reactor.

A third run was made using 9 stages of about 16, 4, 4, 4, 4, 4, 4, 4 and 9 inches respectively. The solids content of the first mixture entering the first stage was about 20% with the solids content of the first stage measured as 23.5%, second as 25%, the fourth as 31%, the seventh as 44.5% and the ninth as 68%. The above data show a net forward flow and substantially linear flow through the reactor.

It will be appreciated that, while the embodiments of the present invention as shown and described herein are necessarily limited to a few forms of the present invention, many variations and modifications thereof are feasible and practical without departing from the spirit and scope of the present invention discussed and claimed herein.

What is claimed is:

1. A continuous mass polymerization process for producing high impact strength polymeric polyblends containing a dispersed grafted rubber phase comprising the steps:

A. charging continuously to an initial continuous stirred isothermal reaction zone a monomer composition comprising at least one monoalkenyl aromatic monomer of the formula

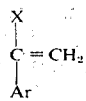

where Ar is selected from the group consisting of a phenyl, halophenyl, alkylphenyl, alkylhalophenyl and mixtures thereof and X is selected from the group consisting of hydrogen and an alkyl radical of less than three carbon atoms having about 2 to 15% of a diene rubber by weight dissolved therein, B. maintaining reaction conditions in said initial continuous stirred isothermal reaction zone having a constant fillage of from 10 to 90% of its volume with said monomer composition such as to produce, a steady state polymerization of said monomer at a temperature of from 110° to 140°C. under a pressure of from 1 to 150 psig. wherein about 10 to 50% by weight of said monomer is polymerized to a first polymer of a predetermined average molecular weight of from about 40,000 to 100,000 $MW_{St}$ at least a portion of said first polymer being grafted to said diene rubber and the remainder being dissolved in said alkenyl aromatic monomer as a monomer-polymer phase, said diene rubber and said grafted diene rubber being dispersed under shearing agitation in said monomerpolymer phase as rubber-monomer particles having a weight average diameter of about 0.5 to 10 microns and having occluded therein a portion of said monomer-polymer phase, C. withdrawing continuously from said initial reaction zone said monomer-polymer phase having said rubber-monomer particles dispersed therein as a first mixture, D. charging continuously said first mixture to a first stage of a continuous staged isobaric stirred reaction zone having a plurality of stages so as to produce substantially linear flow through said stages downstream to a final stage, each of said stages operating at substantially constant gravimetric fillage of from about 15 to 90% of its volume of a polymerizing first mixture, E. maintaining conditions in said continuous staged isobaric stirred reaction zone as a second reaction zone so as to polymerize said first mixture by progressive multistage substantially linear flow polymerization, all said stages operating with shearing agitation and common evaporative vapor phase cooling under isobaric conditions in said second zone, providing each said stage with steady state polymerization at a controlled temperature of from 130° to 180°C. with a pressure of from about 7 to 28 psia and interfacial liquid contact stage to stage establishing a pressure gradient from the first stage downstream to the final stage causing substantially linear flow through said second zone, each said stage operating at a predetermined higher conversion level of from about 10 to 90% producing a composite polymer as a second polymer in said second zone having a predetermined average molecular weight of from about 40,000 to 100,000 $MW_{St}$, thereby maintaining the structural integrity of said rubber-monomer particle, said second zone producing a second mixture having a second polymer solids content being determined by said multistage steady state polymerization and evaporation of said monomers, F. withdrawing continuously said second mixture from said final stage, said second mixture comprising from about 50 to 90% by weight of said first and second polymers as a combined polymer having a predetermined molecular weight distribution consistent with a dispersion index of from about 2.0 to 4.0, at least a portion of said first and second polymer being grafted to said diene rubber and the remainder being dissolved in said monomerpolymer phase, having about 2 to 15% of said diene rubber moiety dispersed in said monomerpolymer phase as grafted rubber-monomer particles having a weight average diameter of 0.5 to 10 microns, and having occluded therein a portion of said monomer-polymer phase, said combined polymers and said grafted diene rubber being separable as polymeric solids from a second mixture volatile phase, G. removing continuously a vapor phase evolved from said polymerizing first mixture in said staged isobaric stirred reaction zone at a rate sufficient to maintain the temperature of said first mixture at a predetermined temperature of from about 130° to 180°C. and under a predetermined isobaric pressure of from about 7 to 28 psia, H. the withdrawing of said second mixture from said final stage being at a rate approximating the total rate at which all additions are made to all stages of said continuous staged isobaric stirred reaction zone, I. heating said second mixture at sufficiently elevated temperatures of from about 200° to 250°C. until said grafted rubber-monomer particles are crosslinked to a predetermined swelling index of from about 7 to 20, J. separating said polymeric solids from said second mixture volatile phase wherein said polymeric solids comprise a polyblend of said combined polymers having dispersed therein crosslinked rubber particles having occluded and grafted first and second polymers present in an amount of about 0.5 to 5 grams for each gram of rubber and a weight average diameter of 0.5 to 10 microns.

2. A process of claim 1, wherein said monoalkenyl aromatic compound is selected from the group consisting of styrene, a-methyl styrene, chlorostyrene, dichlorostyrene, bromostyrene or dibromostyrene and mixtures thereof.

3. A process of claim 1, wherein said diene rubber is selected from the group consisting of polybutadiene, polyisoprene, poly-2-chlorobutadiene, poly-1-chlorobutadiene, copolymers and block copolymers of butadiene-styrene, butadiene-chloroprene, chloroprene-styrene, chloroprene-isoprene, 2-chlorobutadiene-1-chlorobutadiene and mixtures thereof.

4. A process of claim 1, wherein said diene rubber is polybutadiene.

5. A process of claim 4, wherein said polybutadiene rubber has a cis isomer content of about 30 to 98% and a Tg range of from about −50°C. to −105°C.

6. A process of claim 1, wherein said monoalkenyl aromatic monomer is styrene.

7. A process of claim 1, wherein said initial continuous stirred isothermal reaction zone is stirred at a rate at least sufficient to cause shearing agitation and the dispersion of said monomer-rubber phase in said monomer polymer phase.

8. A process of claim 1, wherein said continuous staged isobaric stirred reaction zone is stirred at a rate at least sufficient to cause shearing agitation and to maintain said second mixture homogeneous as to temperature and vapor phase removal.

9. A process of claim 1, wherein the vapor phase removed in step (G) is liquified and returned to said staged isobaric stirred reaction zone at a rate such that steady state polymerization is maintained.

10. A process of claim 9, wherein said liquified vapor phase is returned to the first stage of said staged isobaric stirred reaction zone.

11. A process of claim 1, wherein the vapor phase removed in step (G) is liquified and returned in such manner that at least a portion of said liquified vapor phase is returned to said initial isothermal reaction zone at a rate such that steady state polymerization is maintained.

12. A process of claim 1, wherein the continuous charging of said monomer composition in step (A) is at a rate approximately equal to the rate at which the first mixture is withdrawn in step (C).

13. A process of claim 1, wherein the second mixture volatile phase separated in step (J) is liquified and returned to said initial stirred isothermal reaction zone at a rate such that steady state polymerization is maintained.

14. A process of claim 1, wherein the second mixture volatile phase of step (J) is liquified and at least a portion returned to said continuous staged isobaric stirred reaction zone at a rate such that steady state polymerization is maintained.

15. A process of claim 1, wherein said continuous staged isobaric stirred reaction zone of step (D) has 2 to 15 stages.

16. A process of claim 1, wherein said second reaction zone is substantially horizontal continuous staged isobaric stirred reaction zone.

17. A process of claim 1, wherein said combined polymer has an average molecular weight of 40,000 to 70,000 Staudinger and a dispersion index of 2.2 to 3.5.

18. A process of claim 1, wherein said monomer composition has present about 0.001 to 3.0 percent by weight of a free radical generating catalyst.

19. A process of claim 1, wherein said free radical generating catalyst is selected from the group consisting of ditert-butyl peroxide, tert-butyl peracetate, benzoyl peroxide, lauroyl peroxide, tert-butyl perbenzoate, dicumyl peroxide, tert-butyl peroxide and isopropyl carbonate or mixtures thereof.

20. A process of claim 19, wherein said free radical generating catalyst is tert-butyl peracetate.

21. A process of claim 19, wherein said free radical generating catalyst is di-tert-butyl peroxide.

* * * * *